United States Patent
Ganesan et al.

(10) Patent No.: US 12,418,820 B2
(45) Date of Patent: Sep. 16, 2025

(54) MANAGEMENT OF INFORMATION TECHNOLOGY ASSETS UTILIZING A CELLULAR-BASED MANAGEMENT NETWORK

(71) Applicant: Dell Products L.P., Round Rock, TX (US)

(72) Inventors: Senthil Kumar Ganesan, San Ramon, CA (US); Venkatesan Mahalingam, Pleasanton, CA (US); Vinoth Kumar Arumugam, Fremont, CA (US); Per Henrik Fremrot, Novato, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/478,275

(22) Filed: Sep. 29, 2023

(65) Prior Publication Data

US 2025/0113237 A1     Apr. 3, 2025

(51) Int. Cl.
*H04W 28/02* (2009.01)
*H04L 41/08* (2022.01)
*H04L 41/12* (2022.01)

(52) U.S. Cl.
CPC ......... *H04W 28/0215* (2013.01); *H04L 41/08* (2013.01); *H04L 41/12* (2013.01)

(58) Field of Classification Search
CPC ..... H04L 41/08; H04L 41/12; H04W 28/0215
See application file for complete search history.

(56) References Cited

U.S. PATENT DOCUMENTS

| | | | | |
|---|---|---|---|---|
| 10,178,242 B2 * | 1/2019 | Guday | ............... | H04M 15/8214 |
| 10,817,398 B2 * | 10/2020 | Cencini | .................... | G06F 1/26 |
| 11,569,872 B2 * | 1/2023 | Lin | ......................... | H04B 1/40 |
| 11,582,588 B1 * | 2/2023 | Butler | .................. | H04W 48/18 |

(Continued)

OTHER PUBLICATIONS

Geeks for Geeks, "Spine-Leaf Architecture," https://www.geeksforgeeks.org/spine-leaf-architecture/, Accessed Sep. 29, 2023, 7 pages.

(Continued)

*Primary Examiner* — G. C. Neurauter, Jr.
(74) *Attorney, Agent, or Firm* — Ryan, Mason & Lewis, LLP

(57) ABSTRACT

An apparatus comprises at least one processing device configured to determine whether an information technology asset in an information technology infrastructure environment is equipped with a cellular modem and, responsive to determining that the information technology asset is equipped with the cellular modem, to determine whether a cellular operational profile for a cellular-based management network associated with the information technology infrastructure environment is provisioned for the cellular modem. The processing device is also configured, responsive to determining that the cellular operational profile is provisioned, to establish a connection with the cellular-based management network. The processing device is further configured to obtain, via the cellular-based management network, management commands for controlling operation of the information technology asset, and to provide, to a central processing unit or a baseboard management controller of the information technology asset, the management commands.

20 Claims, 13 Drawing Sheets

(56) References Cited

U.S. PATENT DOCUMENTS

| | | | | |
|---|---|---|---|---|
| 11,706,689 | B2* | 7/2023 | Butler | H04W 48/18 |
| | | | | 455/418 |
| 11,812,506 | B2* | 11/2023 | Xiong | H04W 8/205 |
| 12,112,177 | B2* | 10/2024 | Mandramoorthy | G06N 20/00 |
| 12,133,291 | B2* | 10/2024 | Gundavelli | H04W 12/35 |
| 2022/0353147 | A1* | 11/2022 | Kurmala | H04L 12/4695 |
| 2022/0405106 | A1* | 12/2022 | Mandramoorthy | G06N 20/00 |
| 2023/0126575 | A1* | 4/2023 | Adair | H04W 12/06 |
| | | | | 455/411 |
| 2023/0224705 | A1* | 7/2023 | Daoud | H04W 12/40 |
| | | | | 455/411 |
| 2024/0147240 | A1* | 5/2024 | Boyapalle | H04W 12/06 |
| 2024/0430664 | A1* | 12/2024 | Marilly | H04W 12/40 |

OTHER PUBLICATIONS

M. Wen et al., "Private 5G Networks: Concepts, Architectures, and Research Landscape," IEEE Journal of Selected Topics in Signal Processing, vol. 16, No. 1, Jan. 2022, 19 pages.
A. Aijaz, "Private 5G: The Future of Industrial Wireless," arXiv:2006.01820v2, Jun. 22, 2020, 8 pages.
HPE Aruba Networking, "What is Spine-Leaf Architecture?" https://www.arubanetworks.com/faq/what-is-spine-leaf-architecture/, Accessed Sep. 29, 2023, 4 pages.
Qualcomm, "5G NR-Light (RedCap): Revolutionizing IoT Qualcomm," https://www.qualcomm.com/news/onq/2022/07/what-is-5g-nr-light--a-k-a--redcap--and-how-will-it-accelerate-t, Jul. 18, 2022, 10 pages.

* cited by examiner

MANAGEMENT OF INFORMATION TECHNOLOGY ASSETS UTILIZING A CELLULAR-BASED MANAGEMENT NETWORK

BACKGROUND

As the value and use of information continues to increase, individuals and businesses seek additional ways to process and store information. Information processing systems may be used to process, compile, store and communicate various types of information. Because technology and information processing needs and requirements vary between different users or applications, information processing systems may also vary (e.g., in what information is processed, how the information is processed, how much information is processed, stored, or communicated, how quickly and efficiently the information may be processed, stored, or communicated, etc.). Information processing systems may be configured as general purpose, or as special purpose configured for one or more specific users or use cases (e.g., financial transaction processing, airline reservations, enterprise data storage, global communications, etc.). Information processing systems may include a variety of hardware and software components that may be configured to process, store, and communicate information and may include one or more computer systems, data storage systems, and networking systems.

SUMMARY

Illustrative embodiments of the present disclosure provide techniques for management of information technology assets in an information technology infrastructure environment using a cellular-based management network.

In one embodiment, an apparatus comprises at least one processing device comprising a processor coupled to a memory. The at least one processing device is configured to determine whether an information technology asset in an information technology infrastructure environment is equipped with a cellular modem and, responsive to determining that the information technology asset is equipped with the cellular modem, to determine whether a cellular operational profile for a cellular-based management network associated with the information technology infrastructure environment is provisioned for the cellular modem. The at least one processing device is also configured, responsive to determining that the cellular operational profile for the cellular-based management network associated with the information technology infrastructure environment is provisioned for the cellular modem, to establish a connection with the cellular-based management network associated with the information technology infrastructure environment. The at least one processing device is further configured to obtain, via the established connection with the cellular-based management network associated with the information technology infrastructure environment, one or more management commands for controlling operation of the information technology asset, and to provide, to at least one of a central processing unit and a baseboard management controller of the information technology asset, the one or more management commands.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
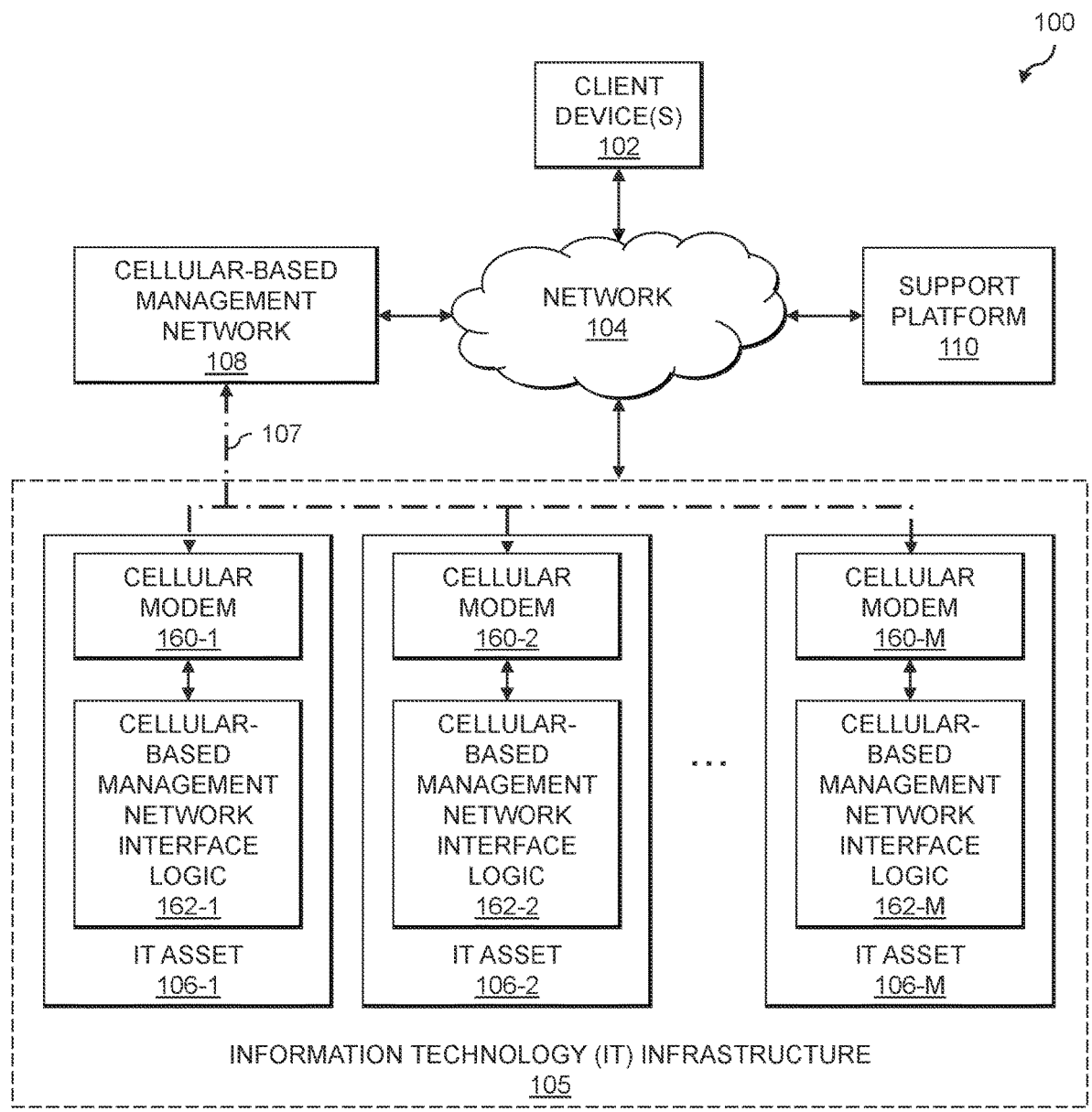
FIG. 1 is a block diagram of an information processing system configured for management of information technology assets in an information technology infrastructure environment using a cellular-based management network in an illustrative embodiment.

FIG. 1 shows an information processing system 100 configured in accordance with an illustrative embodiment. The information processing system 100 is assumed to be built on at least one processing platform and provides functionality for management of information technology (IT) assets in an IT infrastructure environment using a cellular-based management network. The system 100 includes one or more client devices 102 which are coupled via network 104 to an IT infrastructure 105 comprising a plurality of IT assets 106-1, 106-2, . . . 106-M (collectively, IT assets 106). The IT assets 106 are also coupled to the network 104 via a cellular-based management network 108. The cellular-based management network 108 enables the client devices 102 and/or a support platform 110 to perform various management actions for the IT assets 106. The IT assets 106 may include one or more physical and/or virtual computing resources. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

Each of the IT assets 106-1, 106-2, . . . 106-M comprises a corresponding cellular modem 160-1, 160-2, . . . 160-M (collectively, cellular modems 160) and an instance of cellular-based management network interface logic 162-1, 162-2, . . . 162-M (collectively, cellular-based management network interface logic 162). The cellular modems 160 are assumed to comprise one or more integrated antennas and/or be connected with one or more external antennas embodied within or which are associated with the IT assets 106, facilitating cellular-based network connections 107 between the IT assets 106 and the cellular-based management network 108. The cellular modems 160 may include embedded Subscriber Identity Modules (embedded SIMs or eSIMs) which are used for establishing the cellular-based network connections 107 with the cellular-based management network 108. The cellular-based management network interface logic 162 is configured to manage the cellular modems 160, which includes functionality for provisioning cellular network profiles for use in connecting to the cellular-based management network 108, for classifying and forwarding traffic received via the cellular-based management network 108 to different components of the IT assets 106 (e.g., central processing units (CPUs) of the IT assets 106, baseboard management controllers (BMCs) of the IT assets 106, etc.).

The support platform 110 may comprise an IT support system operated by an enterprise or other entity that provides support services for the IT infrastructure 105. The enterprise or other entity that provides support services for the IT infrastructure 105 may be the same as or different than the enterprise or other entity that operates the IT infrastructure 105. For example, an enterprise or other entity operating the IT infrastructure 105 may subscribe to or otherwise utilize the support platform 110 for providing support or management services for the IT assets 106. In some cases, the support platform 110 is operated by a vendor of the IT assets 106. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include the client devices 102 and/or the support platform 110. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise a computer associated with a particular company, organization or other enterprise. Thus, the client devices 102 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

Although not explicitly shown in FIG. 1, one or more input-output devices such as keyboards, displays or other types of input-output devices may be used to support one or more user interfaces to the client devices 102, the support platform 110, and the IT assets 106, as well as to support communication between these elements and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., where such management includes performing servicing of the IT assets 106, or of applications or other software that runs on the IT assets 106). The support platform 110 may also be used to provide management or other support for the IT assets 106 of the IT infrastructure. Such management may involve use of the cellular-based management network 108. In some embodiments, the IT assets 106 of the IT infrastructure 105 are owned or operated by the same enterprise that operates the client devices 102 and/or the support platform 110 (e.g., where an enterprise such as a business provides support for the assets it operates). In other embodiments, the IT assets 106 of the IT infrastructure 105 may be owned or operated by one or more enterprises different than the enterprise which operates the client devices 102 and/or the support platform 110 (e.g., a first enterprise provides support for assets that are owned by multiple different customers, business, etc.). Various other examples are possible.

In some embodiments, the client devices 102 and/or the IT assets 106 may implement host agents that are configured for automated transmission of information that is to be provided to the support platform 110. Such host agents may also or alternatively be configured to automatically receive from the support platform 110 management or configuration commands or other information (e.g., via the network 104 and/or the cellular-based management network 108). It should be noted that a "host agent" as this term is generally used herein may comprise an automated entity, such as a software entity running on a processing device. Accordingly, a host agent need not be a human entity.

The client devices 102, the IT assets 106, the cellular-based management network 108, the support platform 110 and other elements of the information processing system 100 in the FIG. 1 embodiment are assumed to be implemented using at least one processing device. Each such processing device generally comprises at least one processor and an associated memory, and implements one or more functional modules or logic for controlling certain features of the information processing system 100. In the FIG. 1 embodiment, for example, the IT assets 106 comprise the cellular-based management network interface logic 162. At least portions of the cellular-based management network interface logic 162 may be implemented at least in part in the form of software that is stored in memory and executed by a processor.

It is to be appreciated that the particular arrangement of the client devices 102, the IT infrastructure 105, the IT assets 106, the cellular-based management network 108 and the support platform 110 illustrated in the FIG. 1 embodiment is presented by way of example only, and alternative arrangements can be used in other embodiments.

The support platform 110 and other portions of the system 100, as will be described in further detail below, may be part of cloud infrastructure.

The client devices 102, the IT infrastructure 105, the IT assets, the cellular-based management network 108, the support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, the IT infrastructure 105, the IT assets 106, the cellular-based management network 108, the support platform 110, or components thereof or other components of the information processing system 100 in the FIG. 1 embodiment, may be implemented on respective distinct processing platforms, although numerous other arrangements are possible. For example, in some embodiments at least portions of the client devices 102 and the support platform 110 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the IT infrastructure 105, the IT assets 106, the cellular-based management network 108, the support platform 110, or portions or components thereof, to reside in different data centers. Numerous other distributed implementations are possible.

Additional examples of processing platforms utilized to implement components of the system 100 in illustrative embodiments will be described in more detail below in conjunction with FIGS. 9 and 10.

It is to be appreciated that these and other features of illustrative embodiments are presented by way of example only, and should not be construed as limiting in any way.

It is to be understood that the particular set of elements shown in FIG. 1 for management of IT assets in an IT infrastructure environment using a cellular-based management network is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

In the description herein, connections between components or systems within the figures are not intended to be limited to direct connections unless otherwise specified. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

An exemplary process for management of IT assets in an IT infrastructure environment using a cellular-based management network will now be described in more detail with reference to the flow diagram of FIG. 2. It is to be understood that this particular process is only an example, and that additional or alternative processes for management of IT assets in an IT infrastructure environment using a cellular-based management network may be used in other embodiments.

In this embodiment, the process includes steps 200 through 208. These steps are assumed to be performed by the IT assets 106 utilizing the cellular-based management network interface logic 162. In step 200, a determination is made as to whether an IT asset (e.g., one of the IT assets 106) in an IT infrastructure environment (e.g., IT infrastructure 105) is equipped with a cellular modem (e.g., one of the cellular modems 160). The IT infrastructure environment may comprise a data center associated with an enterprise. The IT asset may comprise at least one of a compute node, a storage node and a network switch. The cellular modem may comprise a 5G modem with an embedded SIM. The cellular modem may be part of an interface card plugged into a port of the IT asset (e.g., an M.2 card plugged into a Universal Serial Bus (USB) or Peripheral Component Interconnect Express (PCIe) port or slot). In some embodiments, the IT asset comprises a rack-mounted IT asset, and the cellular modem is coupled to a rack-mount flange connected to the rack-mounted IT asset.

In step 202, responsive to determining that the IT asset is equipped with the cellular modem, a determination is made as to whether a cellular operational profile for a cellular-based management network associated with the IT infrastructure environment is provisioned for the cellular modem. In step 204, responsive to determining that the cellular operational profile for the cellular-based management network associated with the IT infrastructure environment is provisioned for the cellular modem, a connection is established with the cellular-based management network associated with the IT infrastructure environment. The cellular-based management network associated with the IT infrastructure environment may comprise a private cellular network (e.g., a private 5G network) operating at an edge cloud between the IT infrastructure environment and an external network. The FIG. 2 process may further include, responsive to determining that the cellular operational profile for the cellular-based management network associated with the IT infrastructure environment is not provisioned for the cellular modem: identifying a bootstrapping network profile provisioned for the cellular modem; utilizing the bootstrapping network profile to establish a connection with a bootstrapping network; and obtaining, via the bootstrapping network, the cellular operational profile for the cellular-based management network associated with the IT infrastructure environment.

One or more management commands for controlling operation of the IT asset are obtained in step 206 via the established connection with the cellular-based management network associated with the information technology infrastructure environment. The one or more management commands are provided in step 208 to at least one of a central processing unit (CPU) and a baseboard management controller (BMC) of the IT asset.

Figure 2:
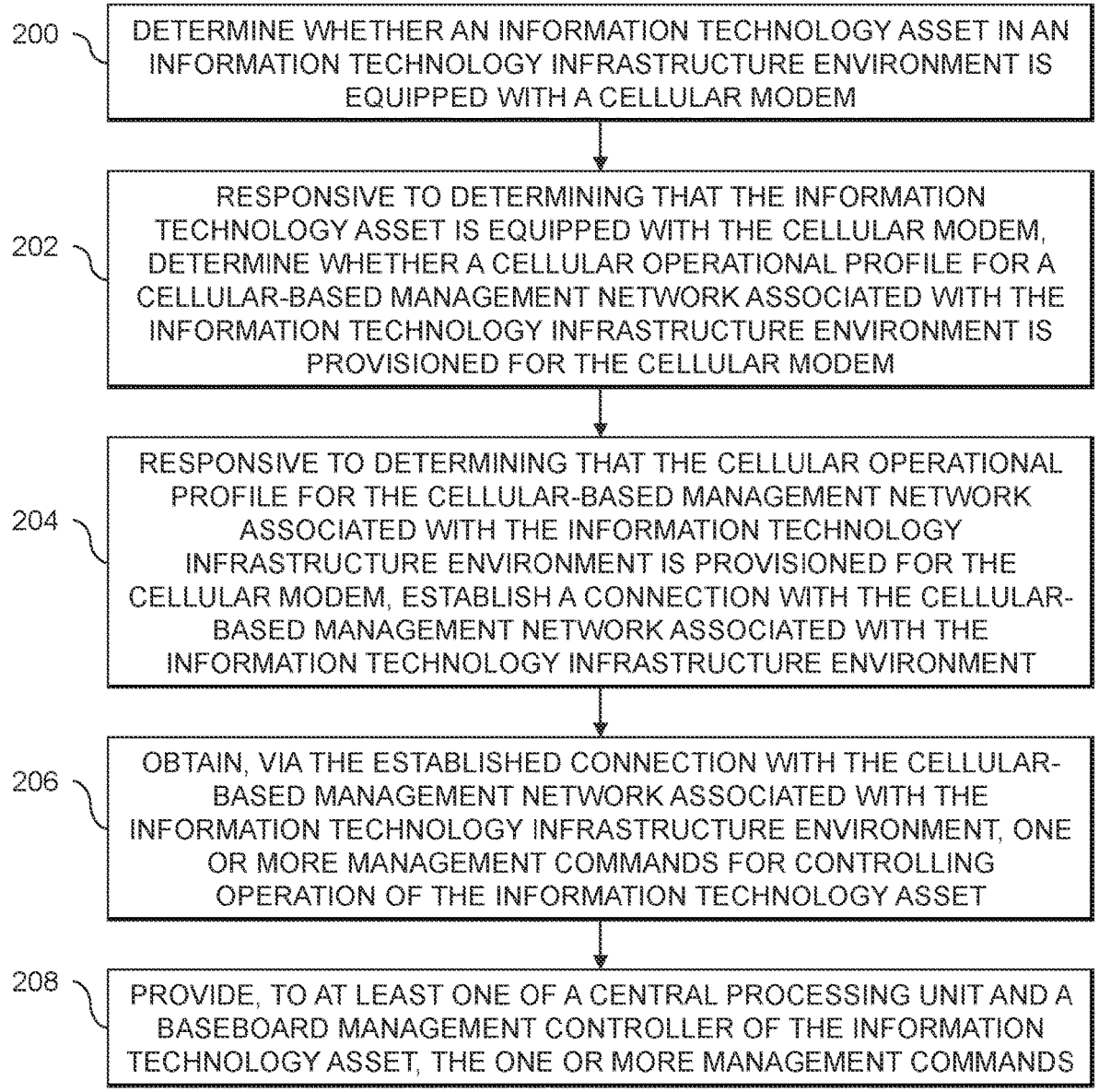
FIG. 2 is a flow diagram of an exemplary process for management of information technology assets in an information technology infrastructure environment using a cellular-based management network in an illustrative embodiment.

The FIG. 2 process may be performed by a microcontroller associated with the cellular modem. The microcontroller may comprise a Wireless Wide Area Network (WWAN) microcontroller (WWANuC). The microcontroller may have a first interface to the CPU of the IT asset and a second interface to the BMC of the IT asset. The first interface and the second interface may comprise respective Ethernet interfaces. The second interface may also or alternatively comprise a sideband System Management bus (SMBus) interface. The microcontroller may be configured to classify the one or more management commands into a first class and a second class, and to provide a first subset of the one or more management commands having the first class to the CPU of the IT asset and to provide a second subset of the one or more management commands having the second class to the BMC of the IT asset.

Nodes or other IT assets in a data center or other IT infrastructure environment may be managed via in-band and/or out-of-band (OOB) management networks. An OOB management network is a dedicated management network that handles management traffic exclusively for the nodes or other IT assets in a data center or other IT infrastructure environment, whereas an in-band management network piggybacks on an existing data network used by the nodes or other IT assets in a data center or other IT infrastructure environment for handling management traffic. Since an OOB management network is a separate network, it incurs additional capital expenditure (CapEx) and operating expenses (OpEx) costs. Setup of an in-band management network can complicate the design and network provisioning of the existing data network. Further, when the data network misbehaves, this will impact an in-band management network thus leading to increased downtime, additional OpEx, etc. In the case of separate baseboard management controller (BMC) and management interfaces, an additional BMC management network may be required. In some approaches, WiFi and Bluetooth network technologies may be used for server or other type of IT asset management.

Illustrative embodiments provide technical solutions for the management of nodes or other IT assets in a data center or other IT infrastructure environment using a cellular-based network (e.g., a private 5G network). 5G evolution and deployments are happening at a rapid pace, and are transforming the way networks are being designed. Cloud operators may offer "Private 5G" fully managed services for the enterprise and edge. The deployment of 5G presents new opportunities as well as challenges. With private 5G, there are clear synergistic benefits in integrating management access into the radio access network (RAN) itself. It should be noted that, while various embodiments are described with respect to the cellular-based management network being a private 5G network, this is not a requirement. The disclosed techniques are applicable to other existing or to-be-developed cellular communication standards, such as 3G, 4G, 6G, etc.

In some embodiments, a 5G or other cellular modem with an embedded Subscriber Identity Module (SIM) (e.g., an embedded SIM or eSIM) and a microcontroller can be introduced in network switches, servers, storage nodes and other types of IT assets in a data center or other IT infrastructure environment to provide management connectivity. A Wireless Wide Area Network (WWAN) microcontroller (WWANuC) may be used to manage the 5G or other cellular modem for both switch management and BMC management. Advantageously, a 5G or other cellular modem may be configured to support a Dual SIM Dual Active (DSDA) configuration with two connections as needed. A microcontroller can classify and forward traffic to a Central Processing Unit (CPU) and/or a BMC via an Ethernet connection (e.g., without requiring any Network Operating System (NOS) software changes needed). The private 5G network may provide optional sideband System Management bus (SMBus) to BMC communication for different functions (e.g., power on/off, reset, etc.).

Figure 3:
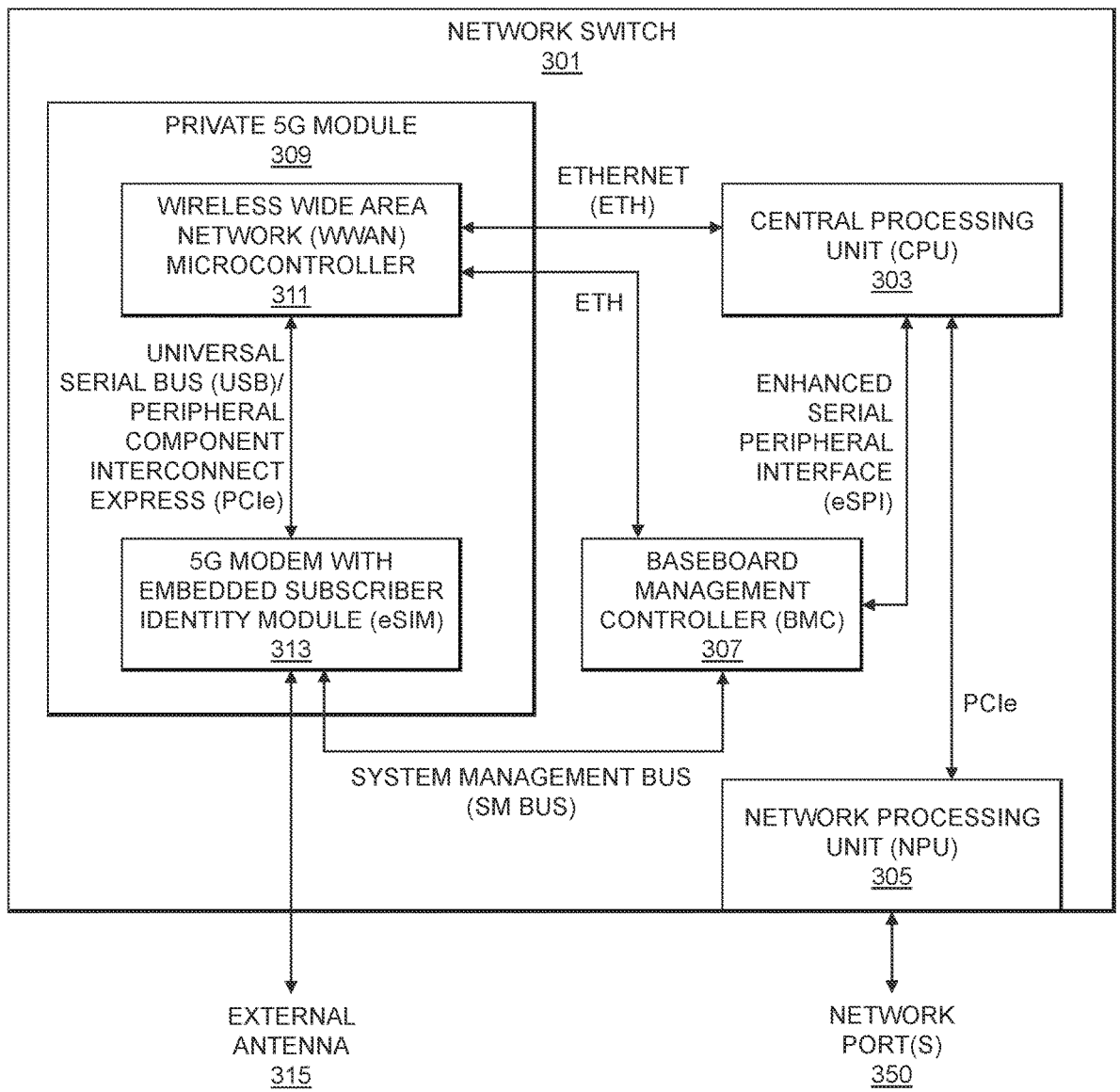
FIG. 3 shows a network switch configured for connection to a cellular-based management network in an illustrative embodiment.

FIG. 3 shows an example of a network switch 301 which is configured with a CPU 303, a Network Processing Unit (NPU) 305 coupled to one or more network ports 350, a BMC 307, and a private 5G module 309. The private 5G module 309 enables the network switch 301 to utilize a private 5G management network. It should be noted that, while FIG. 3 shows an example of a network switch 301 configured with a private 5G module 309, it should be noted that various other types of IT assets may be configured with private 5G modules which enable such IT assets to utilize a private 5G (or, more generally, a cellular-based) management network. In the FIG. 3 example, the CPU 303 and NPU 305 communicate over a Peripheral Component Interconnect Express (PCIe) interface, while the CPU 303 and BMC 307 communicate over an Enhanced Serial Peripheral Interface (eSPI) interface. The private 5G module 309 implements a WWANuc 311 and a 5G modem 313 with an eSIM. The WWANuc 311 and 5G modem 313 may communicate over a Universal Serial Bus (USB) or PCIe interface. The WWANuc 311 is in communication with the CPU 303 and BMC 307 using Ethernet (ETH) interfaces. The 5G modem 313 may also communicate with the BMC 307 utilizing an SMbus interface. The 5G modem 313 is connected to an external antenna 315.

Figure 4A:
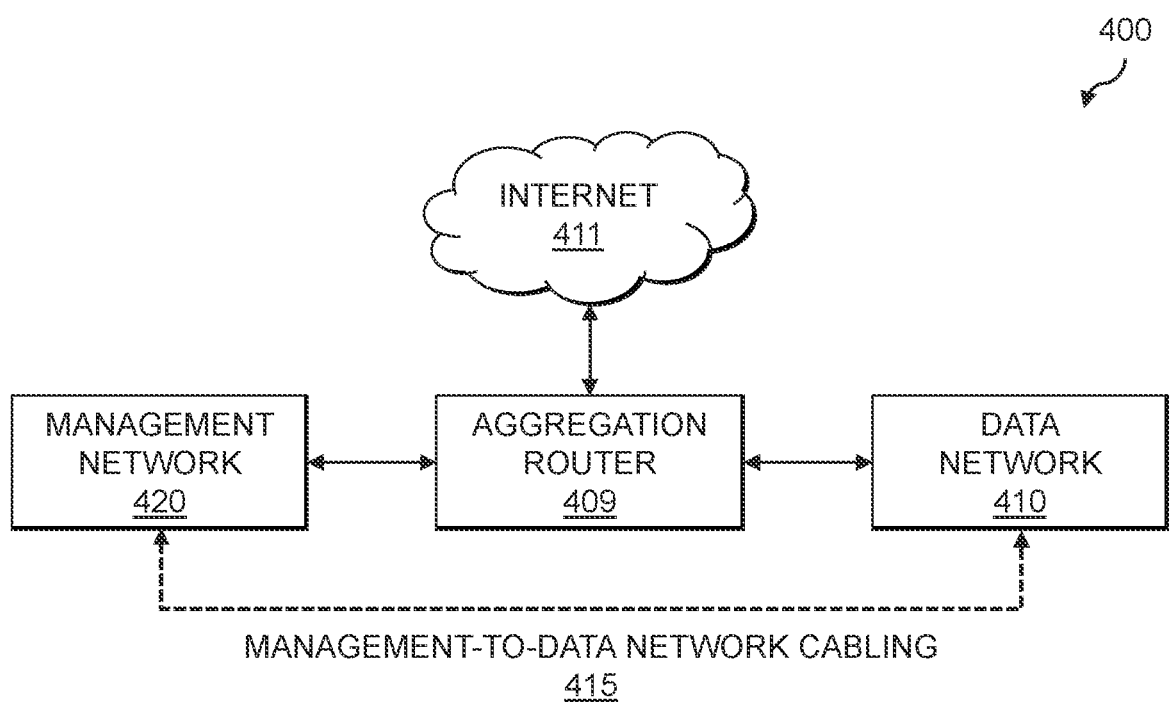
FIGS. 4A-4C show an information technology infrastructure environment utilizing a dedicated out-of-band management network in an illustrative embodiment.
Figure 4B:
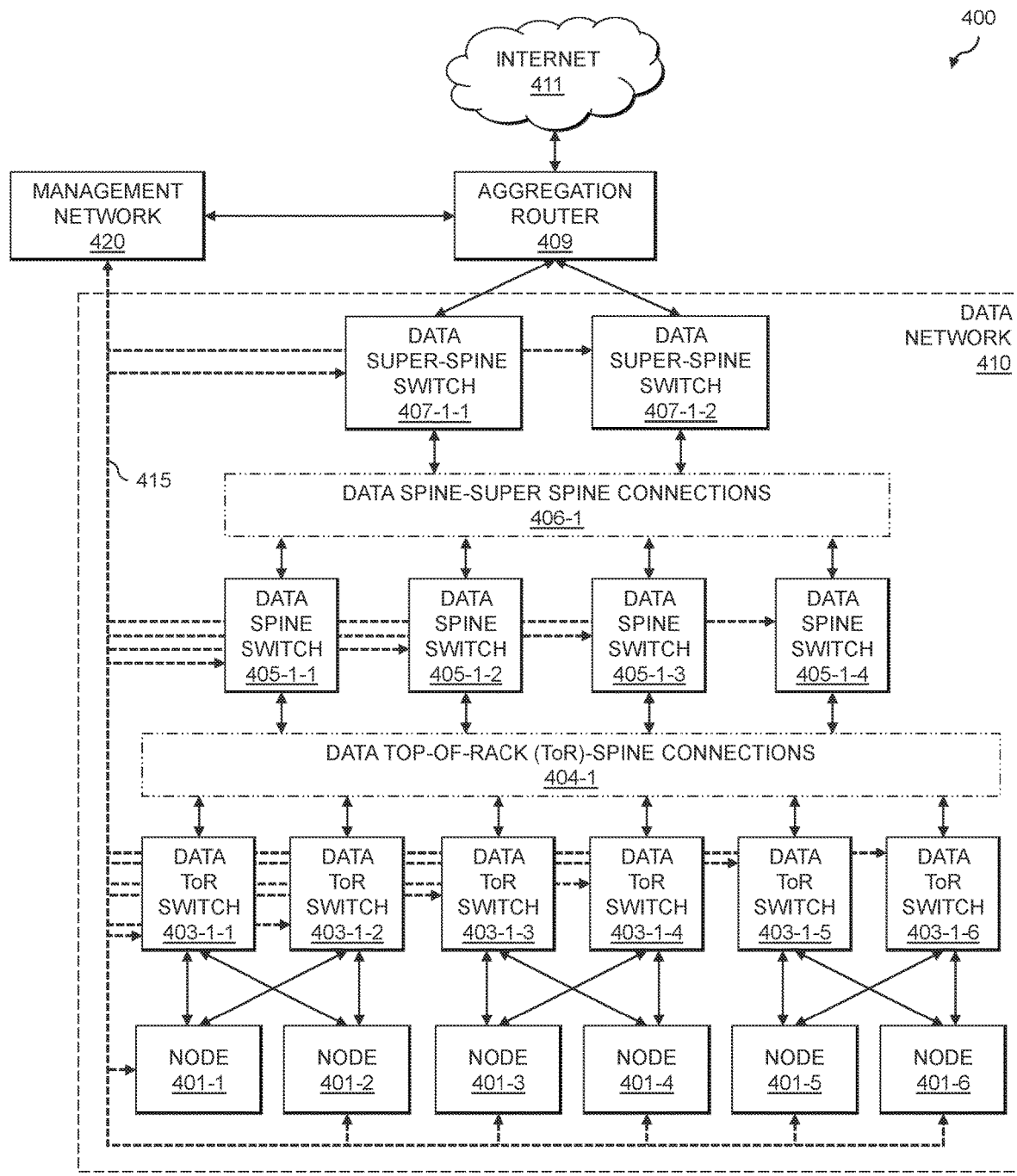
Figure 4C:
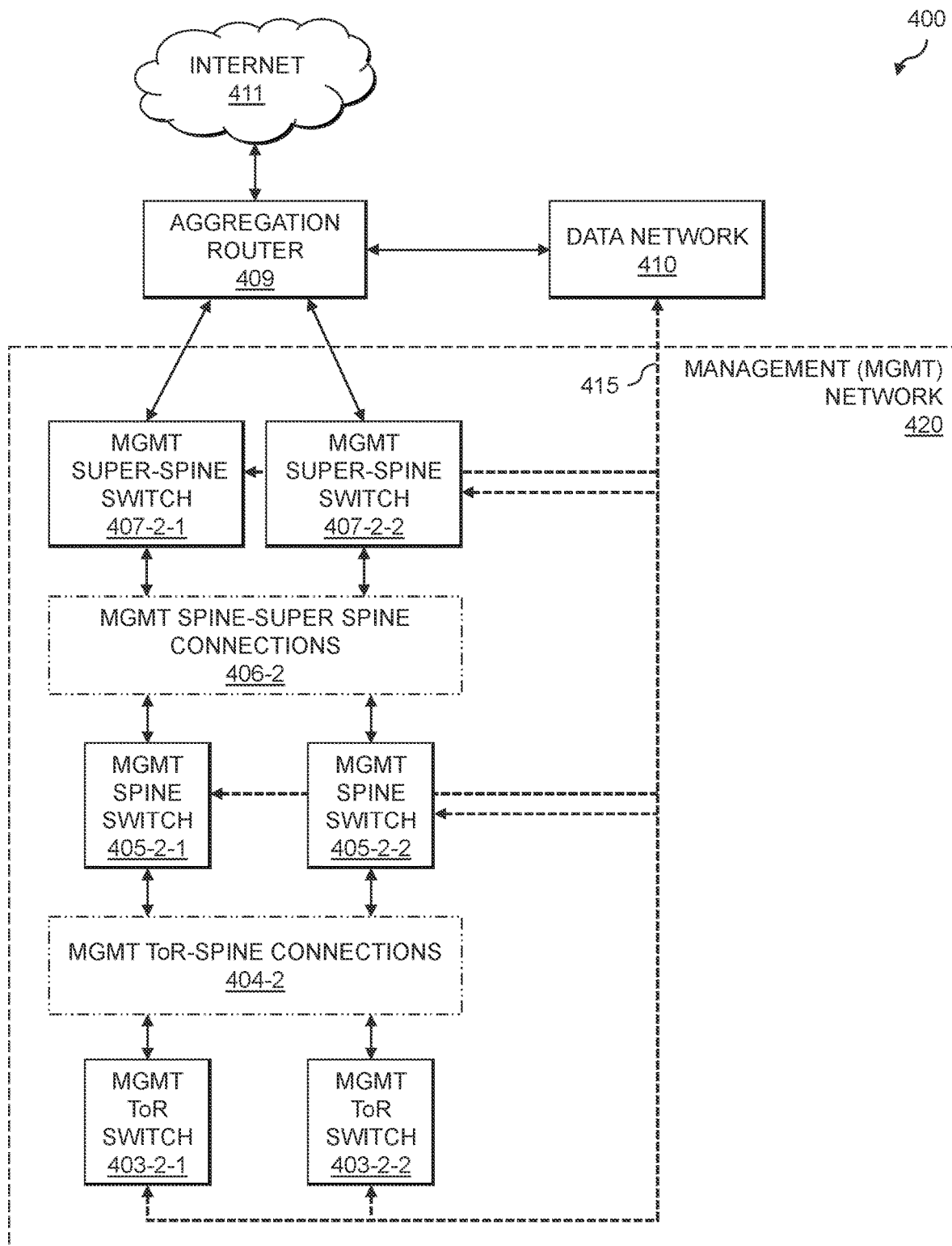

FIGS. 4A-4C show a system 400 in which a plurality of IT assets in an IT infrastructure environment are managed using a separate dedicated OOB management network. As shown in FIG. 4A, the system 400 includes a data network 410 and a management network 420, each of which are connected to an aggregation router 409 connected to the Internet 411. The data network 410 and management network 420 are connected via management-to-data network cabling 415 (e.g., separate physical cables interconnecting each IT asset in the data network 410 with one or more IT assets in the management network 420).

FIG. 4B shows additional details of the data network 410, which comprises a plurality of IT assets using a network topology with three switching layers (e.g., a leaf, spine and super-spine architecture). In the first "leaf" layer, a set of nodes 401-1, 401-2, 401-3, 401-4, 401-5 and 401-6 (collectively, nodes 401) are connected to data Top-of-Rack (ToR) switches 403-1-1, 403-1-2, 403-1-3, 403-1-4, 403-1-5 and 403-1-6 (collectively, data ToR switches 403). In the FIG. 4B example, each of the nodes 401 is connected to two of the data ToR switches 403-1 (e.g., node 401-1 is connected to data ToR switch 403-1-1 and 403-1-2). This, however, is not a requirement. Each of the nodes 401 may be connected to more or fewer ones of the data ToR switches 403-1, the nodes 401 and data ToR switches 403-1 may be part of a full mesh network, etc. In the second "spine" layer, the data ToR switches 403-1 are connected via data ToR-spine connections 404-1 to a set of data spine switches 405-1-1, 405-1-2, 405-1-3 and 405-1-4 (collectively, data spine switches 405-1). In the third "super-spine" layer, the data spine switches 405-1 are connected via data spine-super spine connections 406-1 to a set of data super-spine switches 407-1-1 and 407-1-2 (collectively, data super-spine switches 407-1). It should be appreciated that the particular numbers of the nodes 401, the data ToR switches 403-1, the data spine switches 405-1 and the data super-spine switches 407-1 shown in FIG. 4B are just an example. Other embodiments may use different numbers of nodes, data ToR switches, data spine switches and data super-spine switches. Each of the nodes 401, the data ToR switches 403-1, the data spine switches 405-1 and the data super-spine switches 407-1 has network cabling 415 interconnecting such components with the management network 420.

FIG. 4C shows additional details of the management network 420, which comprises a plurality of IT assets also using the network topology with three switching layers (e.g., the leaf, spine and super-spine architecture). The first "leaf" layer includes a set of management ToR switches 403-2-1 and 403-2-2 (collectively, management ToR switches), which are connected via management ToR-spine connections 404-2 to a "spine" layer including a set of management spine switches 405-2-1 and 405-2-2 (collectively, management spine switches 405-2), which are connected via management spine-super spine connections 406-2 to a "super-spine" layer including a set of management super-spine switches 407-2-1 and 407-2-2 (collectively, management super-spine switches 407-2). Again, the particular numbers of the management ToR switches 403-2, the management spine switches 405-2 and the management super-spine switches 407-2 shown in FIG. 4C are just an example. Other embodiments may use different numbers of management ToR switches, management spine switches and management super-spine switches. Each of the management ToR switches 403-2, the management spine switches 405-2 and the management super-spine switches 407-2 has network cabling 415 interconnecting such components with the data network 410.

Figure 5A:
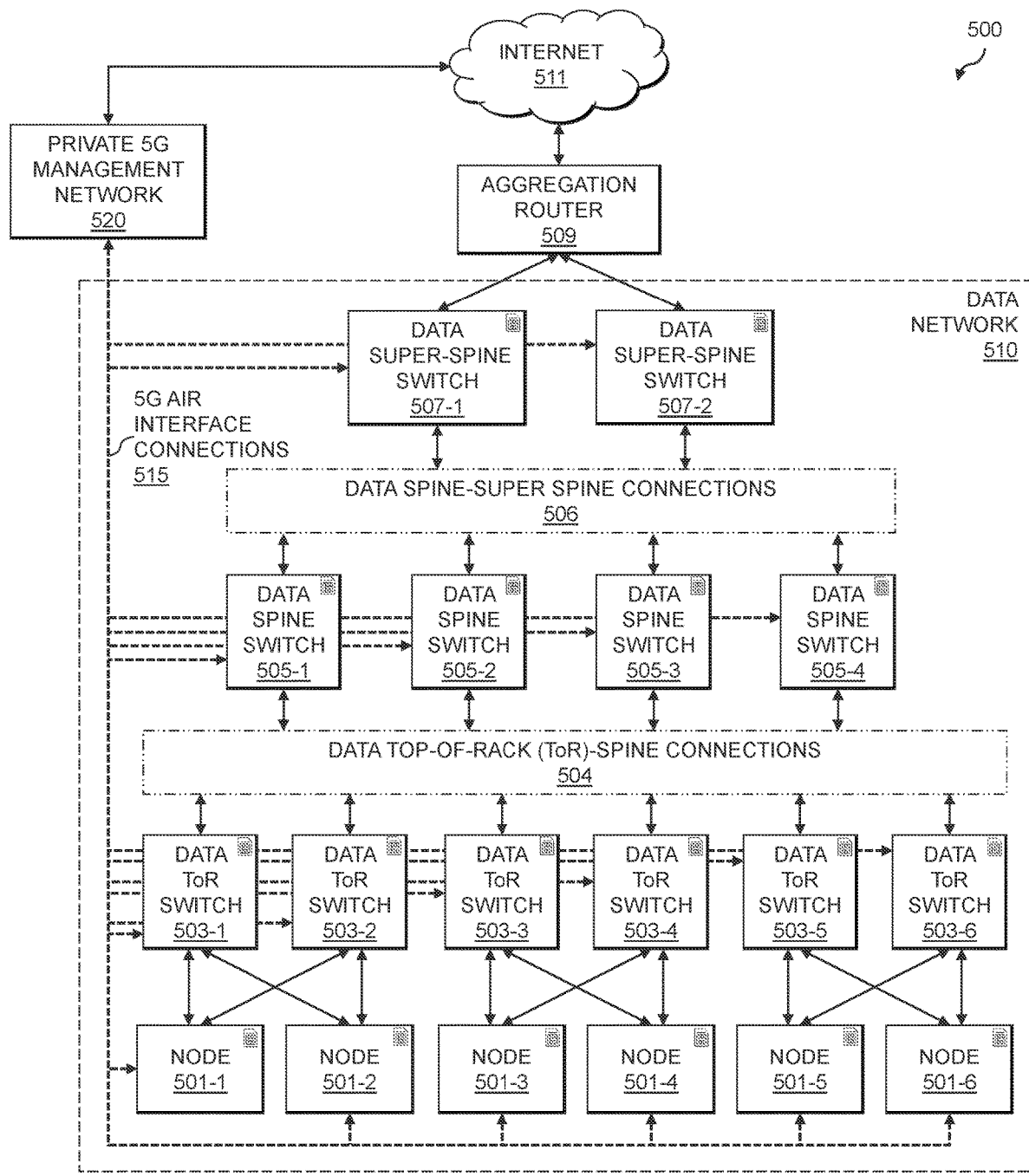
FIGS. 5A and 5B show an information technology infrastructure environment utilizing a cellular-based management network in an illustrative embodiment.
Figure 5B:
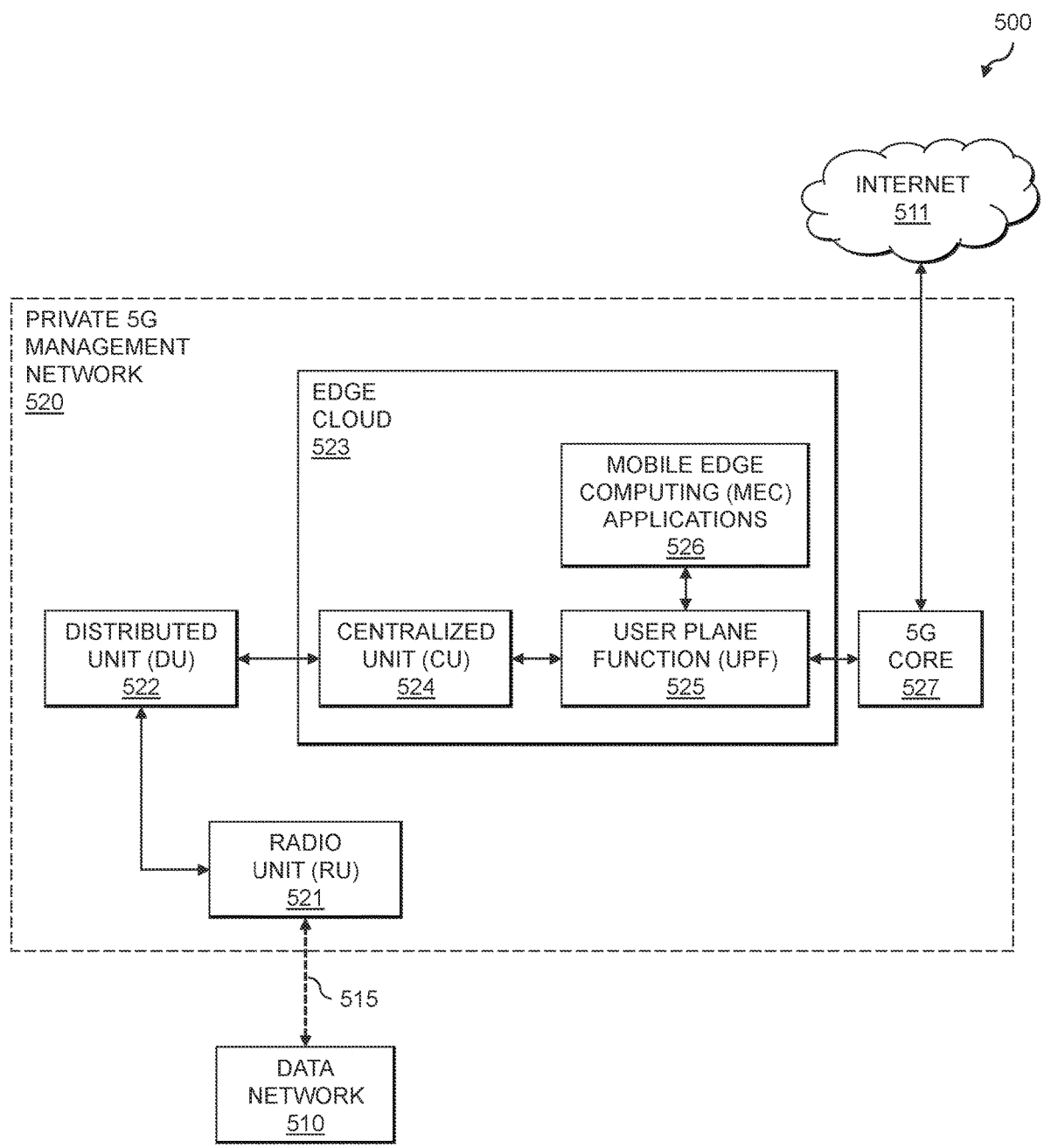

FIGS. 5A and 5B show a system 500 in which a plurality of IT assets in an IT infrastructure environment are managed using a cellular-based management network. As shown in FIG. 5A, the system 500 includes a data network 510 and a private 5G management network 520. The data network 510 (e.g., data super-spine switches 507-1 and 507-2 thereof) is connected to the Internet 511 via an aggregation router 509. As shown in further detail in FIG. 5B, the private 5G management network 520 is also connected to the Internet 511.

FIG. 5A shows details of the data network 510 which, similar to the data network 410, comprises a plurality of IT assets using a network topology with three switching layers (e.g., a leaf, spine and super-spine architecture). In the first "leaf" layer, a set of nodes 501-1, 501-2, 501-3, 501-4, 501-5 and 501-6 (collectively, nodes 501) are connected to data Top-of-Rack (ToR) switches 503-1, 503-2, 503-3, 503-4, 503-5 and 503-6 (collectively, data ToR switches 503). In the FIG. 5A example, each of the nodes 501 is connected to two of the data ToR switches 503 (e.g., node 501-1 is connected to data ToR switch 503-1 and 503-2). This, however, is not a requirement. Each of the nodes 501 may be connected to more or fewer ones of the data ToR switches 503, the nodes 501 and data ToR switches 503 may be part of a full mesh network, etc. In the second "spine" layer, the data ToR switches 503 are connected via data ToR-spine connections 504 to a set of data spine switches 505-1, 505-2, 505-3 and 505-4 (collectively, data spine switches 505). In the third "super-spine" layer, the data spine switches 505 are connected via data spine-super spine connections 506 to a set of data super-spine switches 507-1 and 507-2 (collectively, data super-spine switches 507). It should be appreciated that the particular numbers of the nodes 501, the data ToR switches 503, the data spine switches 505 and the data super-spine switches 507 shown in FIG. 5B are just an example. Other embodiments may use different numbers of nodes, data ToR switches, data spine switches and data super-spine switches. In the FIG. 5A example, each of the nodes 501, the data ToR switches 503, the data spine switches 505 and the data super-spine switches 507 is configured with an embedded SIM enabling a private 5G connection, shown as 5G air interface connections 515, with the private 5G management network 520. It should be noted however, that a data center or other IT infrastructure environment may include some IT assets which are configured with embedded SIMs and others which are not (e.g., it is not a requirement that every IT asset in a data center or other IT infrastructure environment be configured for connection to a cellular-based management network).

FIG. 5B shows details of the private 5G management network 520, which includes a radio unit (RU) 521, a distributed unit (DU) 522, an edge cloud 523 comprising a centralized unit (CU) 524, a user plane function (UPF) 525 and one or more mobile edge computing (MEC) applications 526, and a 5G core 527. The RU 521, DU 522 and CU 524 represent functional splits of a 5G base station. The RU 521 provides a radio hardware unit which, among other functionality, converts radio signals (e.g., sent via the 5G air interface connections 515) into digital signals for transmission over packet networks. The DU 522 is configured to provide support for lower layers of the protocol stack (e.g., radio link control (RLC), medium access control (MAC), physical layer (PHY), etc.), while the CU 524 is configured to provide support for higher layers (e.g., radio resource control (RRC), service data adaption protocol (SDAP), packet data convergence protocol (PDCP), etc.). The UPF 525 provides for packet routing and forwarding to the 5G core 527 which is connected to the Internet 511. The UPF 525 can also provide various other functionality, such as Quality of Service (QOS) and buffering, policy enforcement, etc. The MEC applications 526 provide for real-time or near real-time processing of data at the edge cloud 523.

Figure 6:
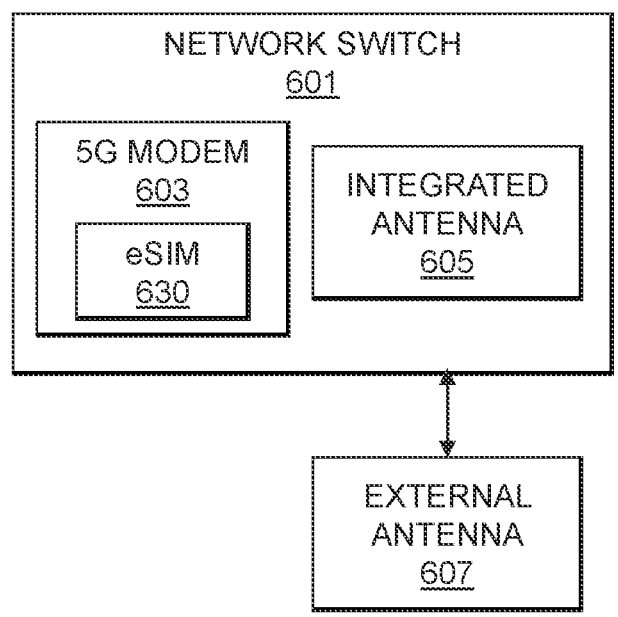
FIG. 6 shows a network switch configured for connection to a cellular-based management network utilizing an integrated or external antenna in an illustrative embodiment.

FIG. 6 shows an example of a network switch 601 configured with a 5G modem 603 having an embedded SIM 630. The network switch also includes an integrated antenna 605 and an optional external antenna 607. The external antenna 607 may be a larger antenna than the integrated antenna 605, and is used when needed (e.g., when the integrated antenna 605 is not sufficient for connection to a private 5G management network). In some embodiments, the 5G modem 603 may be discrete (e.g., an M.2 module, such as an eSIM 5G NR M.2 module implementing a Snapdragon X55 5G modem). Various other types of modems may be used. The 5G modem 603, for example, may comprise a 5G NR-Light modem (e.g., 3GPP Rel17 Redcap) which is low cost and includes a single small antenna option, with speeds of 150 megabits per second (Mbps) uplink, 50 Mbps downlink. The 5G modem 603, as another example, may be a regular 5G NR modem with 2×2 or better multiple input, multiple output (MIMO) antenna diversity and higher bandwidth and cost relative to a 5G NR-Light modem type. The 5G modem 603, as noted above, may be a discrete module (e.g., M.2), or may be a cost and size optimized integrated module (e.g., surface mount). These and other types of modules may be used in IoT and wearable devices. The 5G modem 603 may utilize a USB/PCIe to CPU interface.

Figure 7:
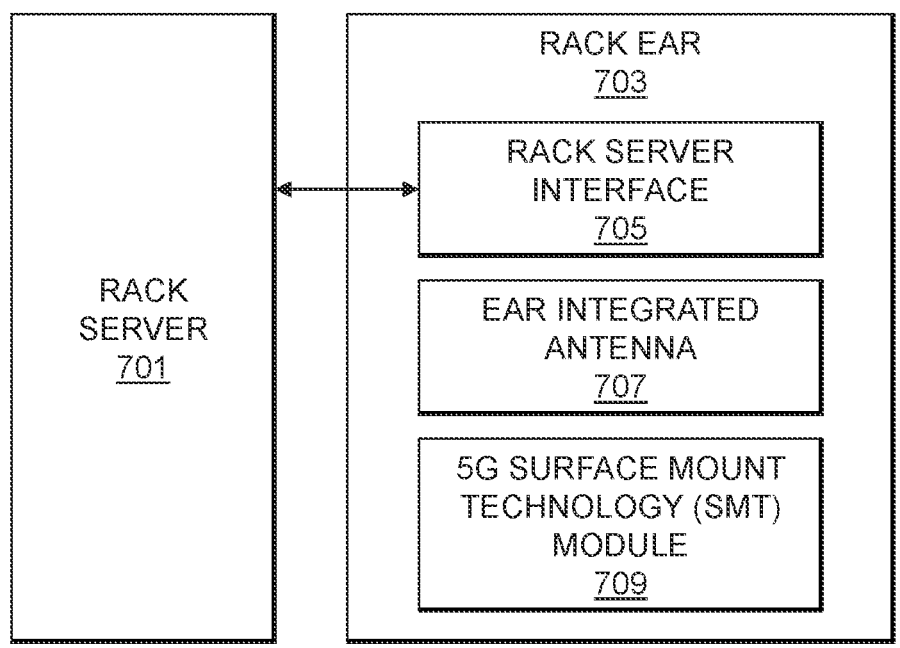
FIG. 7 shows a rack server coupled with a rack ear in which an integrated antenna is configured for connection to a cellular-based management network in an illustrative embodiment.

As noted above, private 5G modules are not limited to use within network switches such as network switch 601. Similar concepts may be extended for various other types of IT assets which may be present in a data center or other IT infrastructure environment. For example, compute and storage nodes (e.g., servers, storage arrays, etc.) may be configured with private 5G modules enabling connection with a private 5G management network. FIG. 7 shows an example of a rack server 701, which is associated with a rack ear 703 (e.g., a rack-mounted flange which may protrude from a front panel of a rack-mounted IT asset such as rack server 701). The rack ear 703 may include or be attached to a rack server interface 705 (e.g., a USB-to-CPU interface), an ear integrated antenna 707, and a 5G surface mount technology (SMT) module 709. The 5G SMT module 709 may comprise a 5G modem and an embedded SIM.

Figure 8:
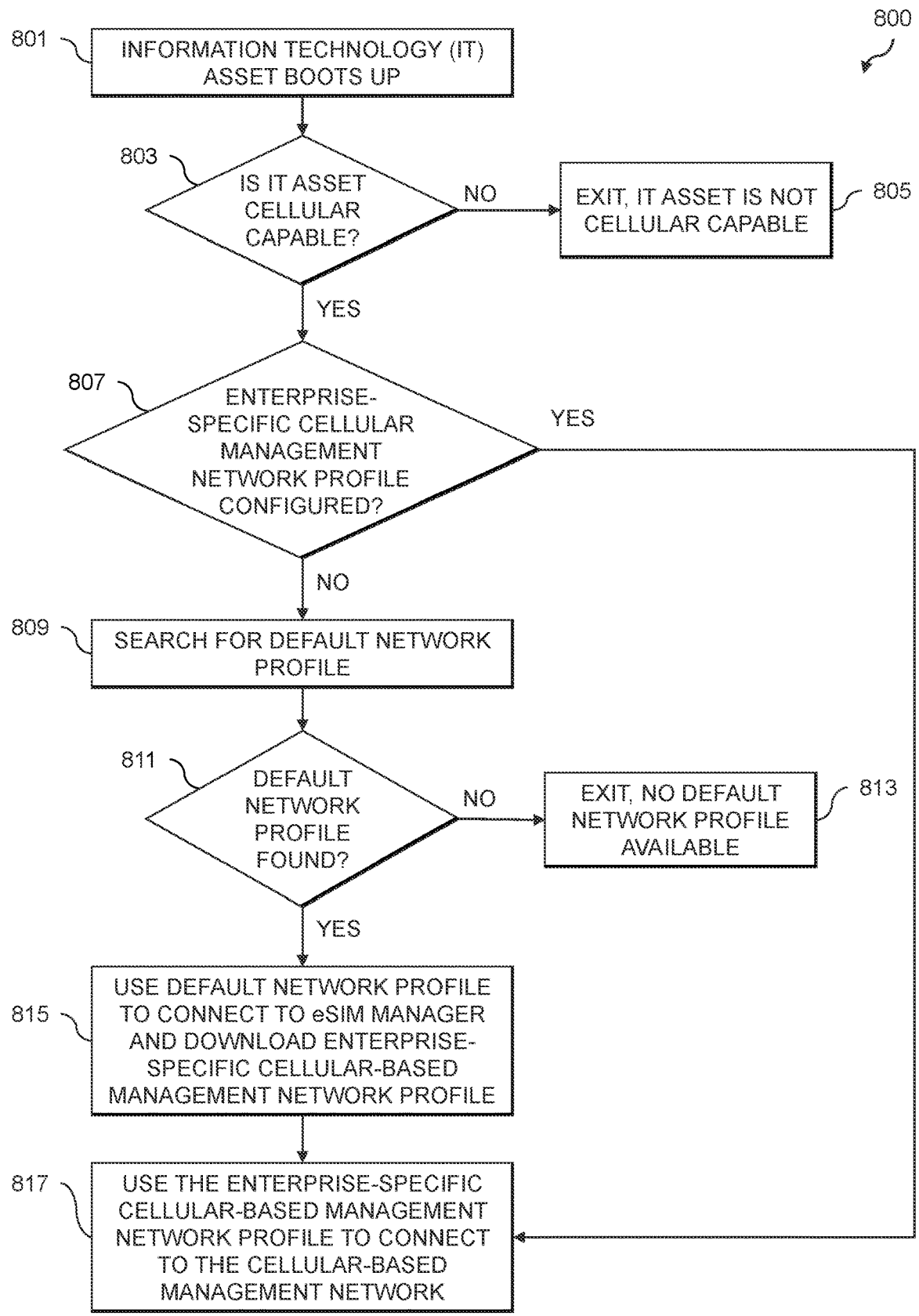
FIG. 8 shows a process flow for an information technology asset to connect to a cellular-based management network in an illustrative embodiment.

FIG. 8 shows a process flow 800 for embedded SIM or eSIM provisioning of a private 5G module of an IT asset, enabling the IT asset to connect with a private 5G management network. An eSIM profile is the software that must be downloaded to a 5G modem (e.g., embedded Universal Integrated Circuit Card (eUICC) software) for accessing nearby private 5G networks. An IT asset equipped with a private 5G module (e.g., a 5G modem and eSIM) should have a default profile (e.g., a bootstrap profile) configured from the factory. The default or bootstrap profile is used by device manufacturers to push an enterprise-specific private 5G profile (e.g., an operational profile) to the 5G modem. The default profile is used to connect to network operators (e.g., in partnership with device manufacturers) for bootstrapping the node. The enterprise-specific private 5G profile is used to connect to the local private 5G management network in a data center or other IT infrastructure environment for zero touch provisioning (ZTP) operation. Once an IP address has been acquired from a private 5G network for dual SIMs, the IT asset will be visible. Ethernet interfaces and a microcontroller of the IT asset are internally provisioned to classify the traffic from both SIMs, and forward such to corresponding destination modules (e.g., a BMC, a host CPU, etc.) based on the classifications. A default ZTP server from the enterprise-specific private 5G profile is used to get the images or other configuration data for both destination modules (e.g., the BMC and host CPU).

The process flow 800 of FIG. 8 begins with step 801, where an IT asset boots up. In step 803, a determination is made as to whether the IT asset is cellular cable (e.g., whether it is equipped with a cellular modem and embedded SIM). If the result of the step 803 determination is no, the process flow 800 exits or ends in step 805 as the IT asset is not cellular capable and thus cannot connect to a cellular-based management network. If the result of the step 803 determination is yes, the process flow 800 proceeds to step 807 where a determination is made as to whether an enterprise-specific cellular operational profile (e.g., a private 5G profile) for a cellular-based management network is configured on the IT asset. If the result of the step 805 determination is yes, the process flow 800 proceeds to step 817 described below. If the result of the step 807 determination is no, the process flow continues to step 809 where a search is conducted for a default network profile. In step 811, a determination is made as to whether a default network profile has been found. If the result of the step 811 determination is no, the process flow exits or ends in step 813 as no default network profile is available. If the result of the step 811 determination is yes, the process flow 800 proceeds to step 815 where the default network profile is used to connect to an eSIM manager and download an enterprise-specific cellular operational profile (e.g., a private 5G profile). In step 817, the IT asset uses the enterprise-specific cellular operational profile (e.g., a private 5G profile) to connect to a cellular-based (e.g., a private 5G) management network.

The technical solutions described herein enable the use of cellular-based network (e.g., private 5G) for a management network of an IT infrastructure environment (e.g., a data center). In some embodiments, IT assets within an IT infrastructure environment are configured with 5G or other cellular modems and dual SIM active-active configurations. This allows support for both BMC and host management using a microcontroller. ZTP of IT assets, such as network switches, is enabled using an intermediate or default profile configured by a device manufacturer. The technical solutions provide a number of technical advantages, including but not limited to CapEx savings for a management network (e.g., eliminating the need for switches, optics and cabling of the management network, NOS and BMC network support, etc.), OpEx savings on visits by support staff to IT infrastructure environments (e.g., for power and cable management of the management network), higher bandwidth, better QoS (e.g., network slicing), lower latency for applications (e.g., closed-loop automation, software-defined network (SDN) control plane, etc.), security by default design with the use of a cellular-based (e.g., private 5G) management network, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for management of IT assets in an IT infrastructure environment using a cellular-based management network will now be described in greater detail with reference to FIGS. 9 and 10. Although described in the context of system 100, these platforms may also be used to implement at least portions of other information processing systems in other embodiments.

Figure 9:
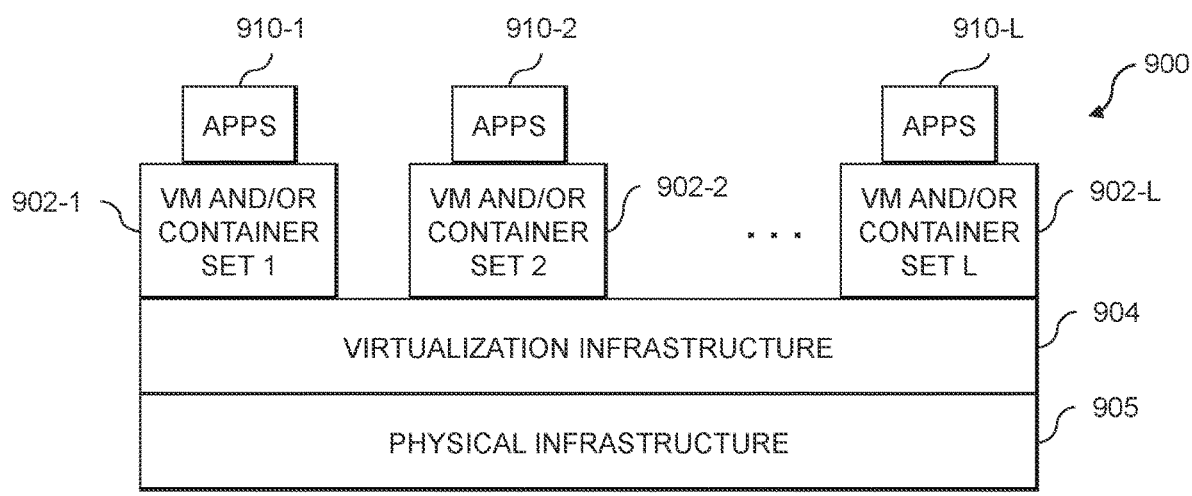
FIGS. 9 and 10 show examples of processing platforms that may be utilized to implement at least a portion of an information processing system in illustrative embodiments.
Figure 10:
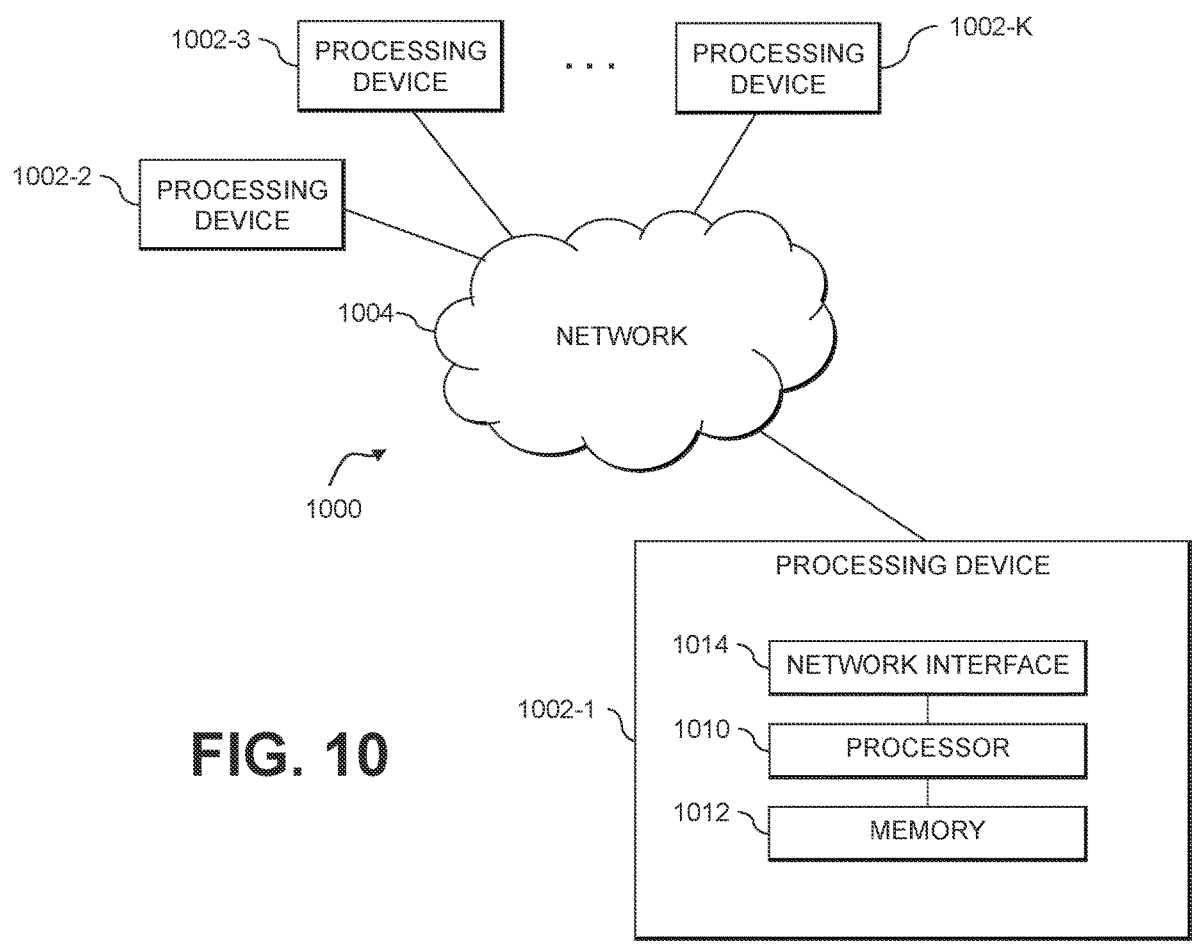

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for management of IT assets in an IT infrastructure environment using a cellular-based management network as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device of an information technology asset in an information technology infrastructure environment, the at least one processing device comprising a processor coupled to a memory;
the at least one processing device being configured:
to establish, utilizing a cellular modem of the information technology asset and a first network profile, a first air interface connection with a network external to the information technology infrastructure environment;
to obtain, at the cellular modem via the first air interface connection established with the external network, a second network profile, the second network profile comprising a cellular operational profile for a cellular-based management network associated with the information technology infrastructure environment;
to establish, utilizing the cellular modem and the second network profile, a second air interface connection with the cellular-based management network associated with the information technology infrastructure environment;
to obtain, at the cellular modem via the second air interface connection established with the cellular-based management network associated with the information technology infrastructure environment, configuration data for provisioning of the information technology asset;
to classify the configuration data into a first class and a second class, the first class comprising configuration data for provisioning network operating system software of the information technology asset, the second class comprising configuration data for performing at least one of hardware power on, power off and reset operations for the information technology asset;
to provide, to a central processing unit of the information technology asset, at least a portion of the first class of the configuration data; and
to provide, to a baseboard management controller of the information technology asset, at least a portion of the second class of the configuration data.

2. The apparatus of claim 1 wherein the information technology infrastructure environment comprises a data center associated with an enterprise.

3. The apparatus of claim 2 wherein the information technology asset comprises at least one of a compute node, a storage node and a network switch.

4. The apparatus of claim 1 wherein the cellular modem comprises a 5G modem with an embedded Subscriber Identity Module (SIM).

5. The apparatus of claim 1 wherein the at least one processing device comprises a microcontroller coupled to the cellular modem.

6. The apparatus of claim 5 wherein the microcontroller comprises a Wireless Wide Area Network (WWAN) microcontroller (WWANuC).

7. The apparatus of claim 5 wherein the microcontroller has a first interface to the central processing unit of the information technology asset and a second interface to the baseboard management controller of the information technology asset.

8. The apparatus of claim 7 wherein the first interface and the second interface comprise respective Ethernet interfaces.

9. The apparatus of claim 7 wherein the first interface comprises an Ethernet interface and the second interface comprises a sideband System Management bus (SMBus) interface.

10. The apparatus of claim 1 wherein the cellular-based management network associated with the information technology infrastructure environment comprises a private cellular network operating at an edge cloud between the information technology infrastructure environment and the external network.

11. The apparatus of claim 1 wherein the cellular modem is part of an interface card plugged into a port of the information technology asset.

12. The apparatus of claim 1 wherein the information technology asset comprises a rack-mounted information technology asset, and wherein the cellular modem is part of rack-mount flange connected to the rack-mounted information technology asset.

13. The apparatus of claim 1 wherein the external network comprises a bootstrapping network of a network operator, the network operator being different than an operator of the information technology infrastructure environment.

14. The apparatus of claim 1 wherein the information technology asset comprises a network switch and the at least one processing device comprises a microcontroller, the microcontroller being coupled (i) to the cellular modem of the information technology asset via a first wired interface, (ii) to the central processing unit of the information technology asset via a second wired interface, and (iii) to the baseboard management controller of the information technology asset via a third wired interface.

15. A computer program product comprising a non-transitory processor-readable storage medium having stored therein program code of one or more software programs, wherein the program code when executed by at least one processing device of an information technology asset in an information technology infrastructure environment causes the at least one processing device:
to establish, utilizing a cellular modem of the information technology asset and a first network profile, a first air interface connection with a network external to the information technology infrastructure environment;
to obtain, at the cellular modem via the first air interface connection established with the external network, a second network profile, the second network profile comprising a cellular operational profile for a cellular-based management network associated with the information technology infrastructure environment;
to establish, utilizing the cellular modem and the second network profile, a second air interface connection with the cellular-based management network associated with the information technology infrastructure environment;
to obtain, at the cellular modem via the second air interface connection established with the cellular-based management network associated with the information technology infrastructure environment, configuration data for provisioning of the information technology asset;
to classify the configuration data into a first class and a second class, the first class comprising configuration data for provisioning network operating system software of the information technology asset, the second class comprising configuration data for performing at least one of hardware power on, power off and reset operations for the information technology asset;
to provide, to a central processing unit of the information technology asset, at least a portion of the first class of the configuration data; and
to provide, to a baseboard management controller of the information technology asset, at least a portion of the second class of the configuration data.

16. The computer program product of claim 15 wherein the cellular modem comprises a 5G modem with an embedded Subscriber Identity Module (SIM).

17. The computer program product of claim 15 wherein the cellular-based management network associated with the information technology infrastructure environment comprises a private cellular network operating at an edge cloud between the information technology infrastructure environment and the external network.

18. A method comprising:
establishing, utilizing a cellular modem of an information technology asset in an information technology infrastructure environment and a first network profile, a first air interface connection with a network external to the information technology infrastructure environment;
obtaining, at the cellular modem via the first air interface connection established with the external network, a second network profile, the second network profile comprising a cellular operational profile for a cellular-based management network associated with the information technology infrastructure environment;
establishing, utilizing the cellular modem and the second network profile, a second air interface connection with the cellular-based management network associated with the information technology infrastructure environment;

obtaining, at the cellular modem via the second air interface connection established with the cellular-based management network associated with the information technology infrastructure environment, configuration data for provisioning of the information technology asset;

classifying the configuration data into a first class and a second class, the first class comprising configuration data for provisioning network operating system software of the information technology asset, the second class comprising configuration data for performing at least one of hardware power on, power off and reset operations for the information technology asset;

providing, to a central processing unit of the information technology asset, at least a portion of the first class of the configuration data; and providing, to a baseboard management controller of the information technology asset, at least a portion of the second class of the configuration data;

wherein the method is performed by at least one processing device of the information technology asset, the at least one processing device comprising a processor coupled to a memory.

19. The method of claim 18 wherein the cellular modem comprises a 5G modem with an embedded Subscriber Identity Module (SIM).

20. The method of claim 18 wherein the cellular-based management network associated with the information technology infrastructure environment comprises a private cellular network operating at an edge cloud between the information technology infrastructure environment and the external network.

* * * * *